Feb. 16, 1937.  W. L. EVERLY  2,070,829
CHEESE PROTECTING DEVICE
Filed Nov. 22, 1933
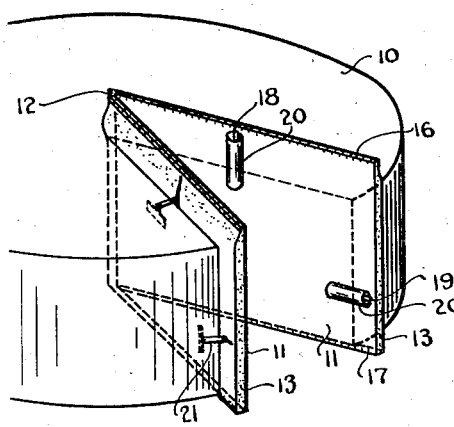
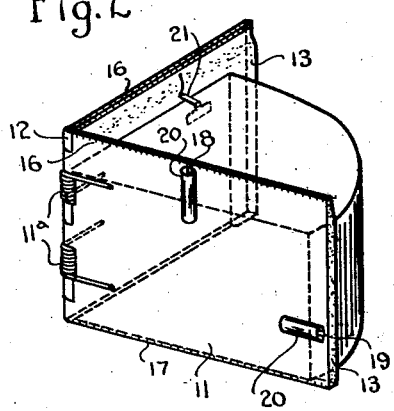
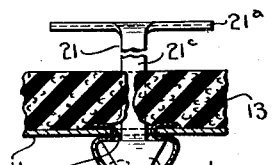
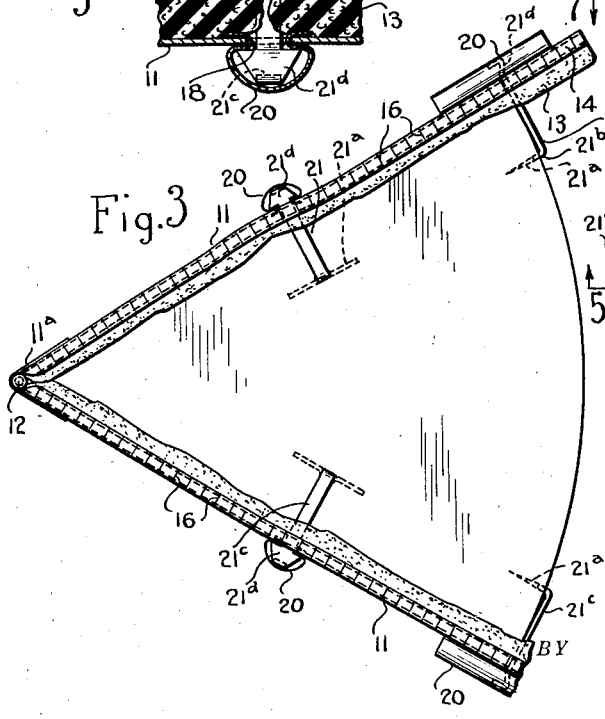
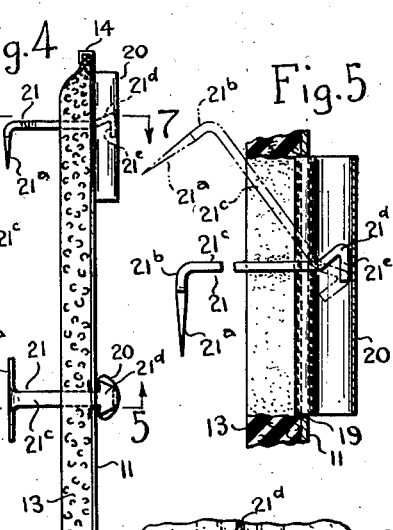
INVENTOR
WILLIAM L. EVERLY
Ely & Barrow
ATTORNEYS.

Patented Feb. 16, 1937

2,070,829

UNITED STATES PATENT OFFICE 2,070,829

CHEESE-PROTECTING DEVICE

William L. Everly, Akron, Ohio

Application November 22, 1933, Serial No. 699,186

10 Claims. (Cl. 31—32)

This invention relates to devices for protecting and preserving cheese.

In grocers' or like stores, cheese is sold in the form of cuttings from large round cakes, cylinders, or bricks of cheese. The cut face or faces of the cheese are, therefore, subject to drying and hardening, and this is the cause of considerable wastage. While devices have heretofore been suggested for protecting the cut surfaces of a cake or block of cheese from such deterioration, none of these have been successful and none have been generally adopted.

The principal difficulty encountered in protecting the cut surface of a block of cheese, is the fitting of the protecting device to the more or less uneven surfaces inevitably produced by the cutting operations. This difficulty has been overcome by the present invention which is directed broadly to the provision of a backing plate, preferably somewhat flexible having, as a facing thereon for application against a surface of the cheese to be protected, a pad of soft deformable resilient material, for example, sponge rubber.

The chief object of the invention, therefore, is to provide an improved device to protect the cut surface of a cheese. More specifically the invention aims to provide a device that more readily conforms to the irregular surface of the cheese; to provide an improved resilient pad for contact with the cut surface of the cheese; and to provide improved means for securing the device to the cheese.

The foregoing and other objects of the invention are attained in the device illustrated in the accompanying drawing and described below. It is to be understood that the invention is not limited to the specific form thereof shown and described.

Of the accompanying drawing,

Figure 1 is a perspective view of a round cake of cheese from which a sector of cheese has been cut and showing a protecting device embodying the invention associated therewith;

Figure 2 is a perspective view of a sector of cheese remaining from such a round cake and showing said device associated therewith;

Figure 3 is a plan view showing the manner in which the protecting device conforms to irregularities in the cut faces of the cheese;

Figure 4 is an outer edge view of one of the cheese protecting members shown in Figures 1 to 3;

Figure 5 is an enlarged fragmentary section on line 5—5 of Figure 4;

Figure 6 is a left elevation of that portion of the device shown in Figure 5; and Figure 7 is an enlarged fragmentary section on line 7—7 of Figure 4.

Referring to the drawing, the numeral 10 designates a round cake of cheese from which a section of cheese has been cut and 11, 11 designate plates of flexible material such as a thin-gauge metal, preferably of a non-corrosive kind, these plates being hinged at 12 so as to swing from an angle in which the sheets are back-to-back to an angle in which the sheets are face-to-face. Springs 11$^a$, 11$^a$ may be provided so as normally to urge said plates to a face-to-face relation and to hold the faces thereof under pressure against the cut faces of the cheese.

On the face of each sheet there is attached, preferably releasably, a pad 13 of soft, elastic material, preferably of a spongy or cellular nature such as sponge rubber. This pad may be releasably secured by reversely bent flange portions 14 and 15 at the top and bottom of the backing sheets 11. These flange portions may be notched by a series of closely spaced cuts thereon as indicated at 16 and 17, respectively, so as not to stiffen the flexible backing sheets 11.

It is necessary to use a soft resilient material for the facing which contacts with the cut surface of the cheese, and for this purpose sponge rubber is peculiarly adapted. Sponge rubber being cellular and yielding easily will fill up the depressions or accommodate itself to the elevations in the surface of the cheese and afford an air-tight covering without exerting sufficient pressure against the anchoring devices to cause the latter to tear out of the soft cheese body. The sponge rubber will not permanently retain odors from the cheese or become sour.

The top and outer edge portions of the sheets 11 may be formed respectively with slots 18 and 19 (see Figures 1 and 7) in which may be engaged clips 20, 20 for securing in various adjusted positions respecting the upper and outer edges of the plates 11, suitable holders 21, 21. These holders (see Figures 5 to 7) comprise comparatively sharp blades 21$^a$ for entering the cheese and supports therefor preferably extending upwardly from the blades as at 21$^b$ and then outwardly as at 21$^c$ through slots 18 or 19 into the clips 20 in which the holders are formed with enlarged heads 21$^d$ substantially of trapezoid shape and which are inclined upwardly from the outer end portions 21$^c$ of the holders, the outer end of the trapezoided portions 21$^d$ having a downwardly bent flange 21$^e$. The sizes of the head $21^d$ and its flange $21^e$ are such with respect to the size of the clips 20, that when the holders are in the normal full-line position thereof shown in Figures 5, 6, and 7 the heads bind frictionally in the clips, but when the holders are swung to the dotted line position of Figure 5, the heads $21^d$ are free to slide along in clips 20. In this manner the holders 21 are adapted for securing the protective device on cakes of cheese of different dimensions and are adapted to be easily released and reengaged with the cheese so that a plate may easily be removed from a face of the cheese to cut a piece therefrom, and may easily be secured upon the freshly cut face of the cheese. The blades $21^a$ are preferably quite broad and the top edges thereof embed in the cheese beneath the surface thereof, which effectively prevents pulling of the holder through the cheese while permitting affixing and holding the plates of the protector against the cut faces of the cheese under considerable pressure.

The resilient pads 13 on the faces of the cheese will deform as required, and the plates 11 will flex more or less, as illustrated in Figure 3 whereby the pads will effectively cover and protect all surfaces of the cheese. By reason of the ability of the holders to shift on their mountings on the backing plates, these are permitted to flex as required to fit the surface of the cheese without interference of said holders with such flexing. They may be easily removed for washing or re-treatment. To assist in holding the pads in place, the portions thereof fitting in the reversely bent flanges 14 and 15 may be substantially solid as by providing strips of substantially solid rubber along the edges of sponge rubber pads.

In use, the plates will be pressed against the cut faces of the cheese to be protected so as to deform the plates and their facings into intimate contact with the cut surfaces of the cheese and the holders 21 will be pressed down into the cheese to secure the plates, so deformed, against the cut surfaces of the cheese.

It will be observed that the flexible backing member and the soft, resilient and easily deformable facing constitute an effective means for sealing the surface of the cheese against air as the backing member conforms in a general way to the main irregularities and the facing conforms to minor irregularities. As a block of cheese may during use have many major and minor irregularities occasioned by cutting portions therefrom, the two members coordinate in such a way as to effectually seal the cheese whatever shape it may take.

It will be understood that either a flexible or inflexible plate or plates having a facing pad or pads and a holder or holders as has been disclosed herein may be adapted for application to the cut faces of cylinders, bricks, or other shapes of cheese, the invention being disclosed respecting the one type of cheese cake for purposes of illustration and not in a limiting sense.

It will also be apparent that by mounting a pad of the kind described on a suitable base or support such as a counter, shelf, floor, etc., and supporting a brick or block of cheese with its cut surface resting on said pad and depressed therein by the weight of the cheese, said cut surface will be effectively protected in the manner of the devices disclosed in the preceding paragraphs. A pad may, of course, be otherwise clamped or pressed against a cut surface of the cheese.

Modifications of the invention other than those referred to herein may be resorted to without departing from the spirit thereof or the scope of the appended claims.

What is claimed is:

1. A cheese protecting device including a member adapted to be fitted over a cut surface of a cake or block of cheese, means for holding said member against said surface, said means comprising a blade adapted to be embedded in the cheese, and means for pivotally and slidably mounting said blade on said member.

2. A cheese protecting device including a member adapted to be fitted over a cut surface of a cake or block of cheese, means for holding said member against said surface, said means comprising a blade adapted to be embedded in the cheese, means for pivotally and slidably mounting said blade on said member, and means associated with said mounting means for holding said mounting means against sliding when said blade is swung against and depressed into a block of cheese.

3. A cheese protecting device including a member adapted to be fitted over a cut surface of a cake or block of cheese, said member having an elastic facing adapted to be deformed by pressure against said face, means associated with said member including a broad blade for embedding in the cake or block of cheese to hold said member against said face of the cheese, and means for supporting said blade so as to embed the top edges of the blade beneath the surface of the block or cake of cheese.

4. A cheese protecting device including a member adapted to be fitted over a cut surface of a cake or block of cheese, means associated with said member including a broad blade for embedding in the cake or block of cheese to hold said member against said face of the cheese, and means for supporting said blade so as to embed the top edges of the blade beneath the surface of the block or cake of cheese.

5. A cheese protecting device comprising a backing sheet of flexible metal, a facing of soft, resilient, deformable material releasably attached thereto by flanges formed at the margins of said backing sheet, said flanges being transversely slit so as to retain the flexibility of the backing sheet, and means for applying the device to a cut surface of a cheese.

6. A device for protecting the irregular cut face of a cake or block of cheese and adapted to seal the exposed surface thereof from the air comprising a flexible backing member extending beyond the surfaces of the cheese and having slit flange portions, slots formed in the extended portions of the backing above and at the side of the cheese, holders located in the slots having angular extensions adapted to be embedded in the cheese, and a soft, resilient, impervious layer on the backing member and adapted to be held under compression by the holders between the backing member and the cheese whereby the irregular face of the cheese will be sealed against air and the backing will be flexed to conform to the irregularities in the face of the cheese.

7. A device for protecting the irregular cut face of a cake or block of cheese comprising a flexible backing member, holders associated with the backing member and having angular extensions adapted to be embedded in the cheese, and a soft, resilient layer on the backing member and adapted to be held under compression by the holders between the backing member and the cheese, whereby the irregular face of the cheese will be sealed against air and the backing flexed to conform to the irregularities in the face of the cheese.

8. A device for protecting the irregular cut face of a cake or block of cheese comprising a flexible backing member, holders associated with the backing member and having angular extensions adapted to be embedded in the cheese, and a layer of sponge rubber on the backing member and adapted to be held under compression by the holders between the backing member and the cheese, whereby the irregular face of the cheese will be sealed against air and the backing flexed to conform to the irregularities in the face of the cheese.

9. A device for protecting the irregular cut face of a cake or block of cheese comprising a flexible backing member, holders associated with the backing member and adapted to be embedded in the cheese, and a soft, deformable layer on the backing member adapted to be held under compression by the holders between the backing and the face of the cheese.

10. A device for protecting the irregular cut face of a cake or block of cheese comprising a flexible backing member having a layer of soft, deformable material secured to a side thereof and contacting the face of the cheese and means to flex the backing member so that it conforms generally to the irregularities in the surface and to compress the layer into close contact with the minor irregularities in the cheese.

WILLIAM L. EVERLY.